(12) United States Patent
Ward et al.

(10) Patent No.: US 7,111,863 B2
(45) Date of Patent: Sep. 26, 2006

(54) TRAILER ALIGNMENT AID WITH UNIVERSAL MOUNTING DEVICE

(76) Inventors: Robert J. Ward, 2702 Woods Trail North, Burnsville, MN (US) 55306; Thomas J. McDonough, 8971 Garland Ct., Eden Prairie, MN (US) 55347

( * ) Notice: Subject to any disclaimer, the term of this patent is extended or adjusted under 35 U.S.C. 154(b) by 15 days.

(21) Appl. No.: 10/886,083

(22) Filed: Jul. 7, 2004

(65) Prior Publication Data
US 2005/0012017 A1    Jan. 20, 2005

Related U.S. Application Data

(60) Provisional application No. 60/487,776, filed on Jul. 15, 2003.

(51) Int. Cl.
  *B60D 1/36*  (2006.01)
  *B60R 1/06*  (2006.01)
(52) U.S. Cl. .................. 280/477; 359/844; 33/264
(58) Field of Classification Search ............... 280/477; 359/841, 844; 33/264
See application file for complete search history.

(56) References Cited

U.S. PATENT DOCUMENTS

| | | |
|---|---|---|
| 3,295,914 A | 1/1967 | Dietrich |
| 3,524,701 A | 8/1970 | Strohmeier |
| 3,767,292 A | 10/1973 | Rutkowski |
| 3,858,966 A | 1/1975 | Lowell |
| 4,163,606 A | 8/1979 | Granno |
| 4,469,405 A | 9/1984 | Chin-Wun |
| 4,905,376 A | 3/1990 | Neeley |
| 4,925,287 A | 5/1990 | Lord |
| 4,936,669 A | 6/1990 | Wun |
| 4,951,913 A | 8/1990 | Quesada |
| 5,111,342 A | 5/1992 | Quesada |
| D329,631 S | 9/1992 | Cameron |
| 5,180,182 A | 1/1993 | Haworth |
| 5,235,468 A | 8/1993 | Stephens |
| D340,219 S | 10/1993 | Moon |
| D344,485 S | 2/1994 | Linne |
| 5,309,289 A | 5/1994 | Johnson |
| 5,313,337 A | 5/1994 | Byers |
| 5,453,915 A * | 9/1995 | Bradley, III ............... 362/144 |
| 5,482,310 A | 1/1996 | Staggs |
| 5,550,681 A | 8/1996 | Mazarac |
| 5,558,352 A | 9/1996 | Mills |
| 5,625,500 A | 4/1997 | Ackerman |
| 5,657,175 A | 8/1997 | Brewington |
| 5,784,213 A | 7/1998 | Howard |
| 5,825,564 A | 10/1998 | Mazarac |
| 5,971,555 A | 10/1999 | Wilcox |

(Continued)

*Primary Examiner*—Kevin Hurley
(74) *Attorney, Agent, or Firm*—Jeffrey Vaitekunas

(57) ABSTRACT

The present invention is directed to systems and methods for trailer alignment including a clamping mechanism configured to rigidly and removably clamp to a neck of a trailer hitch ball. An arm arrangement is rotatably attached to the clamping mechanism. The arm arrangement configured to extend from the clamp arrangement to beyond an edge of a tow vehicle. A mirror may be attached to the arm arrangement and configured to provide a view of the trailer hitch ball from the inside of the tow vehicle. A sight rod may be attached to the clamping device and configured to bend in response to a trailer coupler approaching the trailer hitch ball at a predetermined distance from a selectable angle. The clamping mechanism may include a pair of opposed jaws configured to adjustably clamp between a range of about 0.8 and about 1.5 inches.

20 Claims, 5 Drawing Sheets

U.S. PATENT DOCUMENTS

| | | |
|---|---|---|
| 6,076,847 A | 6/2000 | Thornton |
| 6,132,051 A * | 10/2000 | Morell et al. ............... 359/844 |
| 6,213,608 B1 | 4/2001 | Osgood |
| 6,239,926 B1 | 5/2001 | De Shazer |
| 6,357,126 B1 * | 3/2002 | Gillen, Jr. .................... 33/264 |
| 6,499,851 B1 | 12/2002 | Kelly |
| 6,923,463 B1 * | 8/2005 | Ford et al. .................. 280/477 |
| 2002/0070529 A1 | 6/2002 | Dravecz |
| 2002/0125685 A1 | 9/2002 | White |
| 2003/0209880 A1 * | 11/2003 | Koestler ..................... 280/477 |

* cited by examiner

TRAILER ALIGNMENT AID WITH UNIVERSAL MOUNTING DEVICE

RELATED PATENT DOCUMENTS

This application claims the benefit of Provisional Patent Application Ser. No. 60/487,776, filed on Jul. 15, 2003, to which priority is claimed pursuant to 35 U.S.C. §119(e) and which is hereby incorporated herein by reference.

FIELD OF THE INVENTION

The invention relates generally to trailer alignment systems and methods, and more particularly to trailer alignment systems and methods that mount universally to the neck of a ball on a trailer hitch.

BACKGROUND OF THE INVENTION

Tow vehicles and trailers are often connected using a hitch arrangement at the rear of the tow vehicle and a trailer coupler at the front of the trailer. The hitch typically has a ball of one of a few standard diameters, and the trailer coupler typically has a correspondingly sized socket to accept the ball. To connect the tow vehicle and trailer, the front of the trailer is first elevated to a height adequate to allow the trailer coupler to clear the top of the ball, and then the tow vehicle is backed up to the trailer.

When the hitch and trailer coupler are sufficiently close, the trailer coupler is lowered onto the hitch ball and secured. But it is difficult to see the two connection points while backing most tow vehicles. Thus the assistance of another person to guide the operator is often needed to prevent backing the tow vehicle into the trailer and damaging one or both, either at the connection points or other surface areas. Without assistance, the operator often attempts to manually move the trailer close enough to the tow vehicle to engage the hitch, risking strain or injury.

Frequently, the operator must turn their back, shoulders, and neck into ergonomically stressful positions to look through the rear window to judge the proximity of the tow vehicle to the coupler. Alternately, the operator can repeatedly exit the tow vehicle, inspect the proximity of hitch ball and trailer coupler, and make repeated attempts to adjust the tow vehicle by moving the tow vehicle forward, backward, and to the left or right, which becomes tedious.

The problem of connecting a trailer to a towing vehicle has spurred development of several attempts at solution. Early efforts to address the problem included trailer-mounted mirrors. These include U.S. Pat. No. 3,295,914 to Dietrich (Jan. 3, 1967), with a trailer-mounted mirror. In U.S. Pat. No. 3,524,701 to Strohmeier (Aug. 18, 1970), a mirror is mounted on the trailer jack post. In U.S. Pat. No. 3,767,292 to Rutkowski (Oct. 23, 1973), and in U.S. Pat. No. 4,163,606 to Granno (Aug. 7, 1979), mirrors are mounted on gas bottles secured to the trailer. In U.S. Pat. No. 3,858,966 to Lowell, a mirror is mounted on the trailer. U.S. Pat. No. 5,235,468, to Stephens (Aug. 10, 1993) employs a trailer mount. U.S. Pat. No. 5,309,289 to Johnson (May 3, 1994) uses a mirror mounted on the towed trailer. U.S. Pat. No. 6,076,847 to Thornton (Jun. 20, 2000) also mounts a mirror on a trailer. U.S. Pat. No. 6,239,926 to De Shazer (May 29, 2001) attaches permanently to a single trailer. Design patents granted on trailer-mounted mirrors include U.S. Pat. No. D329,631 to Cameron (Sep. 22, 1992); U.S. Pat. No. D340,219 to Moon (Oct. 12, 1992); and U.S. Pat. No. D344,485 to Linne et al. (Feb. 22, 1994).

However, trailer-mounted mirrors have a number of disadvantages. Because the mirror is mounted on the trailer, the angle from which the tow vehicle can approach the trailer is severely constrained to a narrow range directly in front of the trailer. Each trailer requires a separate device, and most are not easily transferable to another trailer in case more than one trailer must be moved by the same tow vehicle. Because some trailer mounted mirrors are positioned vertically with respect to the trailer coupler and hitch, they are unsuitable for determining from a horizontal perspective the trailer coupler height.

Other efforts to address the problem include mirrors attached to the tow vehicle. While these solve some of the problems inherent in trailer-mounted mirrors by providing temporary attachment of a backing-aid mirror to the tow vehicle, several new problems may arise. For example, magnets have been employed as mounting aids in U.S. Pat. No. 4,905,376 to Neeley (Mar. 6, 1990); and U.S. Pat. No. 5,482,310 A to Staggs (Jan. 9, 1996). However, magnets must be strong enough to be stable but weak enough to disengage easily, they can scratch paint during attachment, adjustment, and detachment, and are unsuitable for use on non-metallic vehicles.

Other problems occur when magnets used for reversible attachment of a backing-aid mirror to a tow vehicle are adhered by suction cups, such as those described in: U.S. Pat. No. 4,925,287 To Lord et al. (May 15, 1990); U.S. Pat. No. 4,936,669 to Wun (Jun. 26, 1990); U.S. Pat. No. 5,111,342 to Quesada (May 5, 1992); U.S. Pat. No. 5,313,337 to Byers (May 17, 1994); U.S. Pat. No. 5,550,681 to Mazarac (Aug. 27, 1996); U.S. Pat. No. 5,784,213 to Howard (Jul. 21, 1998); and U.S. Pat. No. 5,971,555 to Wilcox, et al. (Oct. 26, 1999). Although suction cups can be attached to windows, avoiding the problem of scratching paint, they are subject to different weaknesses, which are circumvented by the present invention.

For example, the use of suction cups requires that the tow vehicle have a surface that is sufficiently flat, clean, and smooth for correct adhesion, which cannot be guaranteed under actual use conditions. If mounted on a painted surface, the cups can scratch the paint. Sometimes, suctions cups are prone to overly forceful attachment, and thus can be difficult to remove. In cold weather, suction cups can lose their flexibility and become unsuitable for their intended use. In rain or when water spray is blown onto the intended mounting surface, suction cups may allow slippage.

Vehicles having a tailgate, such as pickup trucks, some station wagons, and some sports utility vehicles, allow mounting to the edge of the tailgate. Backing aid mounts for tailgates include U.S. Pat. No. 4,905,376 to Neeley (Mar. 6, 1990); U.S. Pat. No. 4,951,913 to Quesada (Aug. 28, 1990); U.S. Pat. No. 5,180,182 to Haworth (Jan. 19, 1993); U.S. Pat. No. 5,550,681 to Mazarac (Aug. 27, 1996); U.S. Pat. No. 5,657,175 to Brewington (Aug. 12, 1997); U.S. Pat. No. 5,784,213 to Howard (Jul. 21, 1998); and U.S. Pat. No. 5,971,555 to Wilcox, et al. (Oct. 26, 1999). However, these devices are limited in scope of application to vehicles having a tailgate. In addition, most are mounted on the centerline of the tow vehicle, so that in use they do not provide any information about the relative height of the tow vehicle hitch ball and trailer coupler as the tow vehicle approaches the trailer, and are only effective when the tow vehicle and trailer are oriented in a narrow range of angles relative to each other.

Others have provided attempts at solutions to trailer alignment issues by requiring permanent modifications to the tow vehicle or tow vehicle hitch. For example, U.S. Pat.

No. 4,469,405 to Chin-Wun (Sep. 4, 1984), comprises two mirrors, one mounted at the front and one at the rear, to generally enable the operator to see the rear of a vehicle by looking up into the mirror mounted at the front of the vehicle. U.S. Pat. No. 5,625,500 to Ackerman (Apr. 29, 1997) mounts to the center of a rear window. U.S. Pat. No. 5,825,564 to Mazarac (Oct. 20, 1998) requires a special support frame; and U.S. Pat. No. 6,213,608 to Osgood (Apr. 10, 2001) requires special modifications to the hitch or vehicle. However, these attempts at solution require permanent modifications of the tow vehicle and as a result are only suitable for vehicles having the special modification.

SUMMARY OF THE INVENTION

The present invention is directed to systems and methods for trailer alignment including a removable clamping mechanism that securely clamps to a neck of a trailer hitch ball. An arm arrangement is attached to the clamping mechanism and positionally adjustable to a number of angles relative to the clamping mechanism. The arm arrangement configured to extend from the clamp arrangement to beyond an edge of a tow vehicle. A mirror may be attached to the arm arrangement and configured to provide a view of the trailer hitch ball from the inside of the tow vehicle.

Embodiments of a device in accordance with the present invention may include a sight rod attached to the clamping device and configured to bend in response to a trailer coupler approaching the trailer hitch ball at a predetermined distance from a selectable angle. The clamping mechanism may include a pair of opposed jaws configured to adjustably clamp between a range of about 0.5 and about 2 inches in one configuration, and adjustably clamp between a range of about 0.8 and about 1.5 inches in another configuration.

One of the opposed jaws may be manufactured from a U-shaped channel, providing at least a three point contact between the opposed jaws and the neck. The clamping mechanism may include a five bar mechanical locking arrangement configured to lock the clamping mechanism on the neck in a first arrangement of the five bars, and to release the clamping mechanism from the neck in a second arrangement of the five bars. The first and second arrangements may be selected by moving a first bar selected from the five bars relative to a second bar selected from the five bars.

An adjusting screw may be connected between two of the five bars and configured to adjust an opening between the opposed jaws over the clamp range. A further embodiment includes a lighting system coupled to the arm arrangement and configured to provide a light directed onto the ball.

Embodiments of the present invention are directed to collapsible devices, wherein the arm arrangement includes a first arm, a swivel plate having a selection of openings, and a pin configured to be removably insertable into a selected opening. The pin thereby positions the first arm at a predetermined angle of rotation relative to the clamping mechanism, which adjusts the height and position of the mirror relative to the tow vehicle. A second arm may be hingedly attached to the first arm and removably attached to the mirror. The mirror may be attached to the arm arrangement using a ball and socket, thereby providing rotational and angular adjustment of the mirror relative to the arm arrangement. The hinge system may include a spring biased pin configured to lock the first arm and the second arm in an extended position, and may be depressed to release the arm for folding.

Embodiments of methods of the present invention may involve providing an alignment aid having a mirror, an arm arrangement, and a clamping mechanism. The clamping mechanism may be clamped onto a neck of a trailer hitch ball. The arm arrangement may be extended from a compacted arm arrangement to an extended arm arrangement. The mirror may then be positioned to provide a view of the trailer hitch ball from within the tow vehicle.

Another embodiment may further involve providing a site rod coupled to the alignment aid, and positioning the site rod between the trailer and the tow vehicle. Yet another embodiment may further involve providing a lighting system coupled to the alignment aid and projecting light from the lighting system onto the trailer hitch ball.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
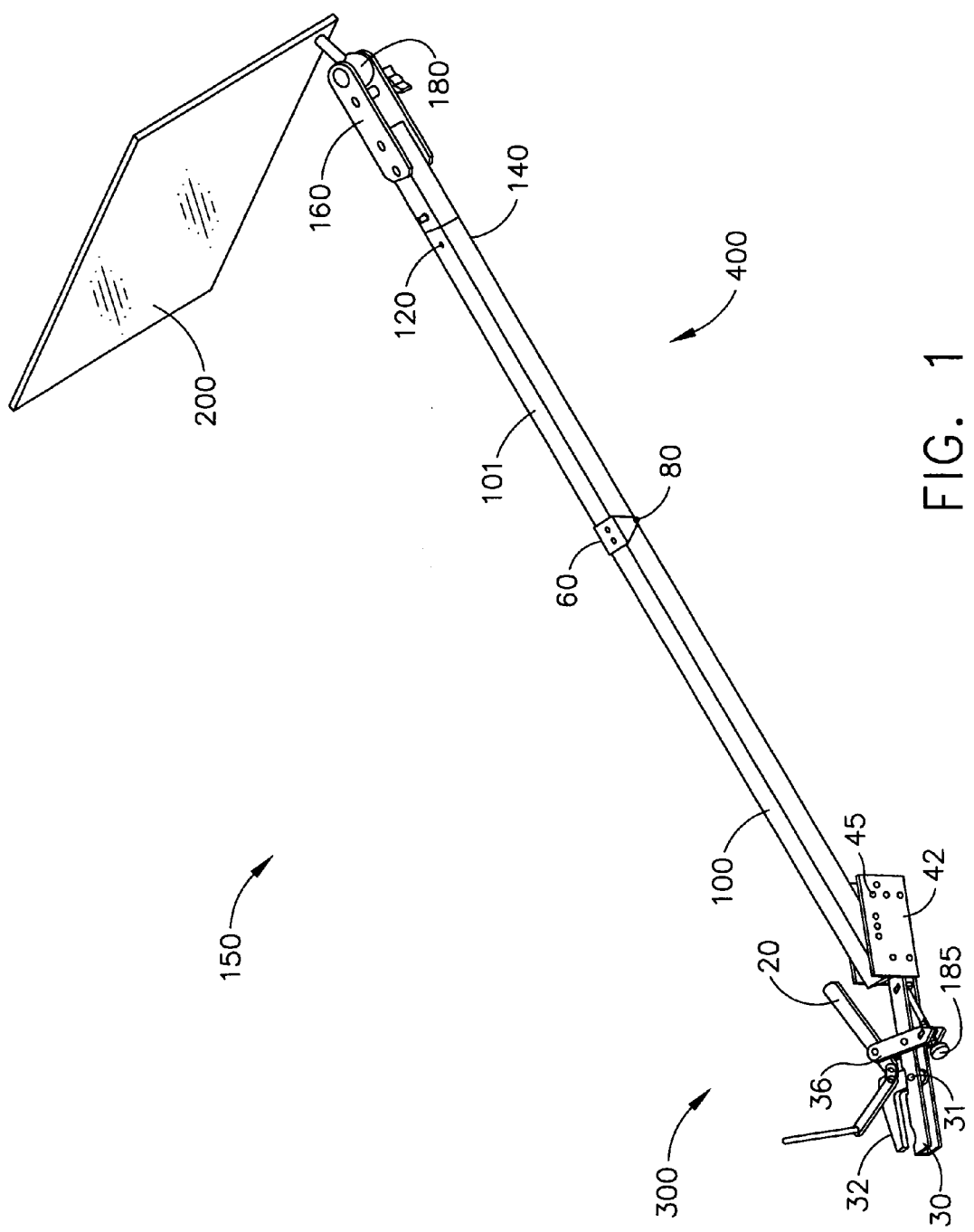
FIG. 1 is a perspective view of a trailer alignment device in accordance with the present invention.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings, which form a part hereof, and in which are shown by way of illustration, various embodiments by which the invention may be practiced. It is to be understood that other embodiments may be utilized, and structural and functional changes may be made without departing from the scope of the invention.

Methods, devices and systems in accordance with the present invention may include one or more of the features, structures, methods, or combinations thereof described herein. It is intended that methods, devices and systems in accordance with the present invention need not include all of the features and functions described herein, but may be implemented to include selected features and functions that provide for useful structures and/or functionality.

The present invention is directed to a visual aid for aligning trailers and towable items, such as boats, farm implements, cars, trucks, campers, etc., with tow vehicles. The present invention provides for quickly and easily aligning a trailer with a tow vehicle. An embodiment of the present invention includes an easily attachable and removable visual aid for use in aligning the tow vehicle with the trailer that is universally accepted onto the neck of any standard trailer hitch ball. A trailer in this context is understood to indicate a towable item, having or lacking independent self-propulsion, which is pulled by the propulsion arrangement of another vehicle. The term "tow vehicle" indicates a vehicle providing sufficient propulsion force to move both the tow vehicle and the trailer when the trailer is connected by a hitch.

Embodiments of a device in accordance with the present invention allow the operator to sit in the seat of a tow vehicle and use the vehicle's side and/or rear-view mirrors to view an image of the trailer hitch and trailer coupler as the two are brought into close proximity. An adjustable mirror provides visual access to the connecting points of both vehicle and trailer coupler so that the operator can judge distances between points. Some arrangements of the present invention enable the operator to gauge the vertical offset between the trailer and tow vehicle relative to each other as well.

A trailer alignment device in accordance with the present invention alleviates much of the difficulty of bringing a tow vehicle and trailer coupler into close proximity so the coupler can engage the hitch ball. Hitches are frequently mounted on the rear center of tow vehicles. Some vehicles may have hitches mounted in front, such as one that is used in a facility where large numbers of trailers are stored. A trailer alignment device in accordance with the present invention may be rapidly mounted on any conventional ball hitch, regardless of where it is mounted on the tow vehicle, and enable the operator to see the hitch ball and trailer coupler as the tow vehicle approaches the trailer coupler.

Standard hitch balls are available in several sizes, and the size corresponds to the "rating", defined as the upper limit of tow weight. Typical commercially available hitch ball diameters include 1⅞ inches, 2 inches, 2 5/16 inches and 2½ inches. Metric hitch ball sizes may also be accommodated by the invention. Trailer couplers are of corresponding sizes to ensure adequate coupling to securely engage the ball. The trailer alignment device is designed to rapidly mount to a trailer hitch by clamping onto part of the hitch.

FIG. 1 is a perspective view of a trailer alignment device 150 in accordance with the present invention. The trailer alignment device 150 includes a mirror 200, a clamping mechanism 300, and an arm system 400. The clamping mechanism 300 includes a fixed bar 30, and a clamp bar 32 pivotably coupled by a first pin 31. A pair of clamp plates 36, that are positionally adjustable by an adjusting screw 185, couple a handle 20 to the fixed bar 30 using the clamp plates 36. A pair of swivel plates 42 couples the clamping mechanism 300 to the arm system 400. The swivel plates 42 includes at least one set of matching holes 45 to provide a stop for the rotatable arm system 400 using a swivel anchor pin 44 (not shown), as will be described further with respect to FIG. 3 in more detail.

Figure 2:
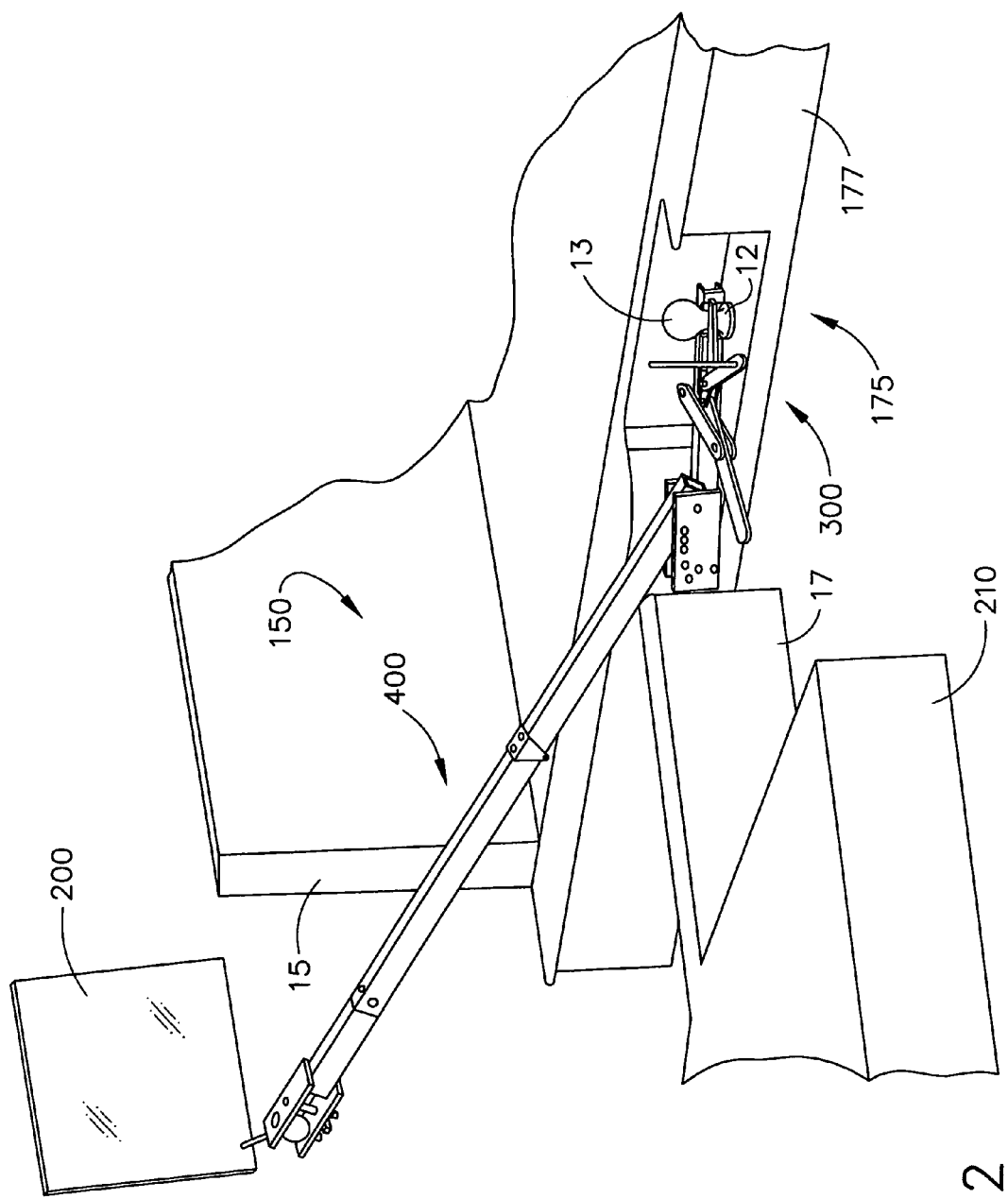
FIG. 2 is a perspective view a trailer alignment device clamped to the neck of a trailer ball in accordance with the present invention.

Referring now to FIG. 2, a perspective view is illustrated of the trailer alignment device 150 in use according to an embodiment of the present invention. The trailer alignment device 150 engages a neck 12 of a hitch ball 13 using the clamping mechanism 300, allowing the operator to quickly connect the trailer alignment device 150 to a tow vehicle 15, or sequentially to a number of tow vehicles, without the use of special modifications to a hitch 175 or the tow vehicle 15. Because the trailer alignment device 150 attaches quickly and easily to the neck 12 of any standard hitch ball 13, the trailer alignment device 150 is universally useful on any tow vehicle having a conventional ball hitch. Because the hitch ball 13 is the point of contact with the tow vehicle 15, the risk of surface damage to paint associated with the use of other attachments, such as magnets and suction cups, is obviated, and the risk of the trailer alignment device 150 falling off is avoided.

The trailer alignment device 150 may be used by several tow vehicles, and/or to tow several trailers in succession. The clamping mechanism 300 that engages the ball 13 is adjustable to accommodate a wide range of hitch or standard hitch ball sizes. As will be described in more detail below, the structure of the trailer alignment device 150 may be compact and foldable, so many problems associated with storage are obviated.

By virtue of engaging the neck 12 of the hitch ball 13, the trailer alignment device 150 is widely adaptable to virtually all tow vehicles having conventional ball hitches, without modification to the tow vehicle, hitch, trailer, or towable item. The trailer alignment device 150 may be rapidly mounted or clamped to the neck 12 of the hitch ball 13, an arm system 400 may be deployed, and a mirror 200 may be adjusted to an angle sufficient for the operator of the tow vehicle 15 to view a trailer coupler 17 on a trailer 210. This allows the operator to view the hitch 175 and trailer coupler 17 in an ergonomically unstressed position so that the hitch 175 and trailer coupler 17 may be positioned into close proximity without the help of another person. This is achieved by observing the reflected image of the connection point either directly using the mirror 200, or indirectly through a standard rear-view mirror. Hitch ball 13 is mounted on tow vehicle 15 by attaching to a bumper 177, a receiving mechanism, tow anchor, or other existing projection, which is part of or attached to the tow vehicle. The trailer alignment device 150 is attached to the neck 12 of hitch ball 13, leaving the upper part of the hitch ball 13 free to engage the trailer coupler 17 of a towable item such as the trailer 210.

Figure 3:
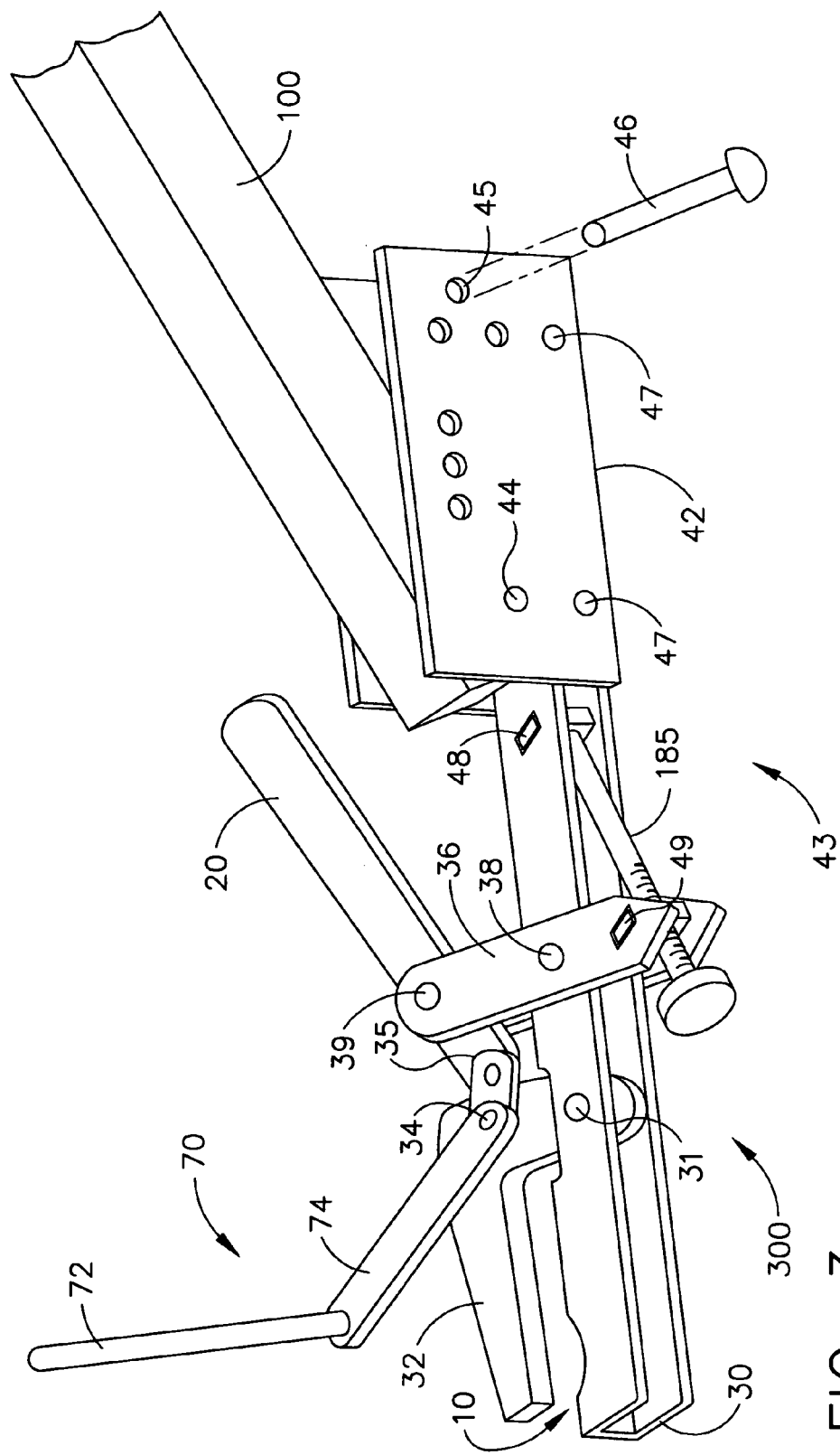
FIG. 3 is a perspective view of the clamp assembly of a trailer alignment device in accordance with the present invention.

FIG. 3 is a view of the adjustable clamping mechanism 300 of the present invention when open, such as before clamping to a hitch ball for use. Fixed bar 30 is connected to clamp bar 32 by a first pin 31. A clamping gap 10 between fixed bar 30 and clamp bar 32 is large enough to pass around part of a trailer hitch, such as the neck of a hitch ball, and small enough that the two bars may be reversibly clamped around the part of a trailer hitch to mount the trailer alignment device 150 with sufficient rigidity as to be a useful aid in aligning a tow vehicle to a trailer 210.

To accommodate these neck diameters, the trailer alignment device 150 is made with an adjusting screw 185. The adjusting screw 185 provides a great degree of adaptability to the trailer alignment device 150, providing a range of adjustability to accommodate any standard hitch ball neck size. In order to rapidly clamp hitch ball necks of varying diameters, the operator may adapt the trailer alignment device 150 by adjusting the screw 185. The screw 185 may be adjusted to apply different degrees of tension of the clamp bar 32 on the ball neck 12.

As is illustrated in FIG. 3, the fixed bar 30 may be formed from a U-shaped channel, such as an extruded aluminum or bent steel channel, for example. The U-shape provides for sufficient rigidity to firmly attach and clamp the clamping mechanism 300 to the ball neck 12, while providing sufficient flexibility to allow at least three points of contact between the clamping mechanism 300 to the ball neck 12. This provides for rigid support of the mirror 200. Also, the U-shaped channel may be easily cut to provide access for the clamp bar 32 into the channel, as well as access for the adjusting screw 185 and other components. This decreases costs and improves manufacturability.

Figure 4:
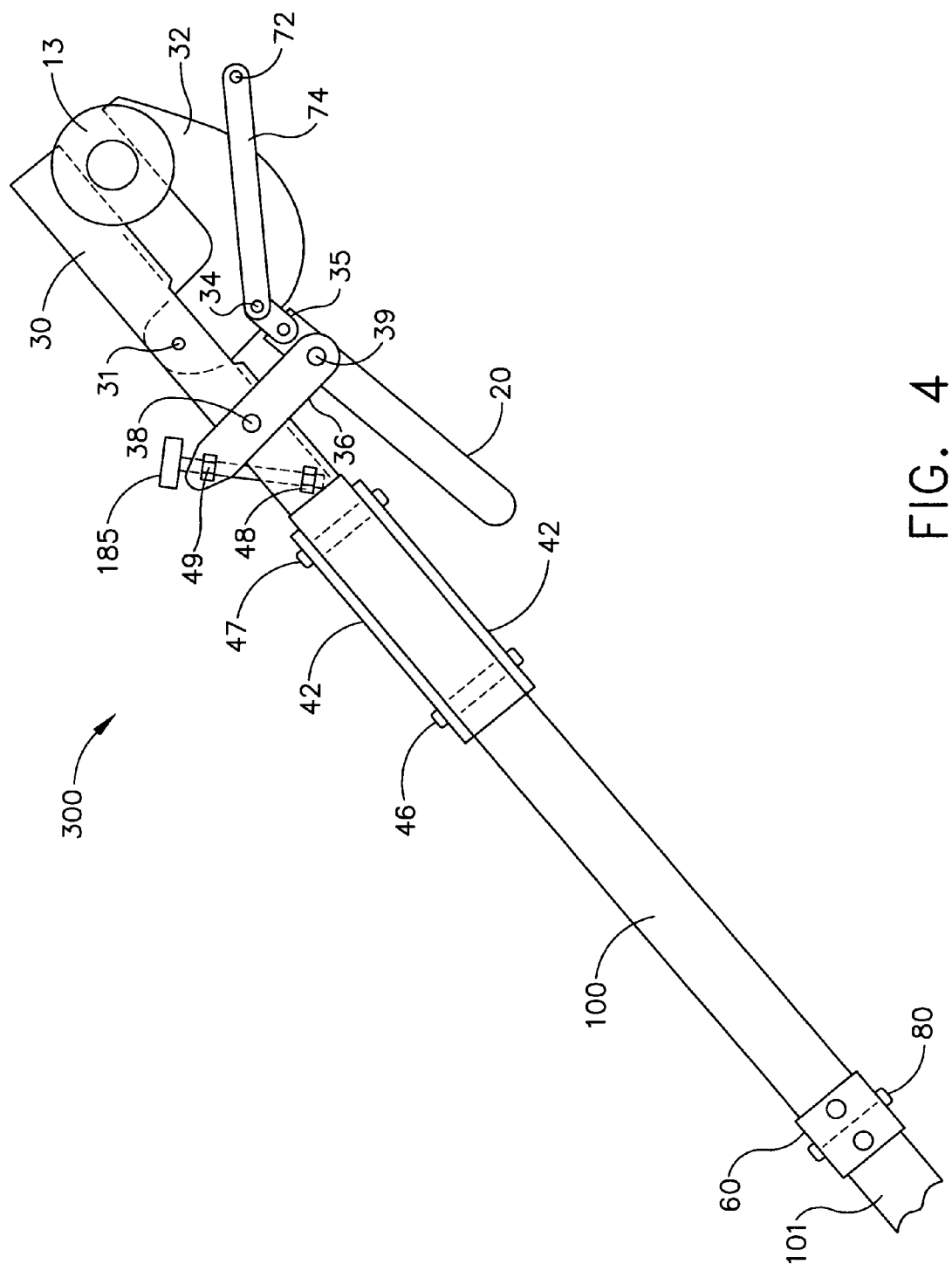
FIG. 4 is a top view of the clamp assembly of trailer alignment device clamped on the ball of a trailer hitch in accordance with the present invention.

Referring to FIGS. 3 and 4, clamping is achieved by a pair of clamp plates 36 pivotally mounted with the pivoting anchor 38 and having a pin 39 connectedly. positioned to clamp plates 36 such that the pin 39 retains the handle 20. Sufficient leverage is obtained by the handle 20, which may be rotated about the pin 39, to force a link 35 against the clamp bar 32 to allow the clamping gap 10 to close around the neck 12 of the hitch ball 13.

The link 35 rotates about the clamp bar 32 and the handle 20, providing a locking action to lock the clamping mechanism 300 on the ball neck 12 for use when the handle 20 is moved toward the fixed bar 30. The Handle 20 and link 35 provide for easily unlocking and removing the clamping mechanism when the handle 20 is pulled away from the fixed bar 30.

The adjusting screw 185 is adjustably positioned between the clamp plates 36 and the fixed bar 30 by anchors 48 and 49 respectively. A useful range of manipulating the adjusting screw 185 provides the clamping gap 10 to vary from about 1.5 inches to about 0.8 inches when the handle 20 is in the closed position. A useful dimension for the link 35 is about 0.75 inches pivot center to pivot center. A useful dimension from pivoting anchor 38 to pin 39 is about 1.5 inches. A useful distance from first pin 31 to pin 34 is about 1.25 inches. And a useful distance from the pin 39 to the link 35 is about 1 inch. The distances provided above provide a useful clamping action for about 2.5 inch jaws formed by opposing fixed bar 30 and clamp bar 32. The dimensions provided above are illustrative of one useful example, and are not intended to be limiting.

A sighting device 70 may be provided, such as by attaching a sight rod 72 to the clamp bar 32 using a bar 74. The bar 74 may be adjustably and rotatably hinged to the clamp bar 32 using the second pin 34, for example. The sight rod 72 may be, for example, a spring about 6 inches tall, or may be manufactured from a polymer or other suitable material. The sight rod 72 may be rotatably positioned and adjusted, along with the angle of the mirror 200, to provide a visual reference for when the trailer coupler 17 is over, in front of, or behind, the hitch ball 13. For example, the sight rod 72 may be positioned so that when the trailer coupler 17 approaches the hitch ball 13, the sight rod 72 is bent by the trailer coupler 17. Also, depending on which side the mirror is located with respect to the tow vehicle 15, seeing the sight rod 72 in front of, or behind the trailer coupler 17 as the tow vehicle 15 is moved toward the trailer 210 provides an indication of which way the tow vehicle 15 needs to be adjusted for proper alignment with the trailer coupler 17.

Proximal to the clamping mechanism 300, on the fixed bar 30, the pair of swivel plates 42 are mounted using, for example, a set of bolts 47. The armpiece 100 may be hingedly connected to the pair of swivel plates 42 by the swivel anchor pin 44. Swivel plates 42 may have several sets of matching holes 45. In use, after the trailer alignment device 150 is reversibly clamped to the ball 13, armpiece 100 may be rotated through the plane defined by the swivel anchor plates 42 until the best angle is reached. Then, a removable pin 46 may engaged in the appropriate pair of matched holes 45 to allow the armpiece 100 to be supported by the removable pin 46 so that the trailer alignment device 150 is deployed in the position most effective for the operator.

The armpiece 100 being hingedly anchored to a swivel anchor 43 allows the armpiece 100 to rotate in a plane parallel to the swivel plates 42. A plurality of pairs of matched holes 45 in the swivel plates 42 allow the armpiece 100 to be supported at a plurality of angles relative to the clamping mechanism 15 by inserting an anchor pin 46 into the pair of matched holes 45 that provides the desired position of the mirror 200.

Matched holes are holes that are positioned to allow a single anchor pin to pass through the holes to form an anchoring support. Proximal to the swivel anchor 43 on the armpiece 100, the hinge 80 and locking arrangement 60 are provided, by which arrangement the second armpiece 101 may be connected. The hinge 80 and locking arrangement 60 may be advantageously positioned on opposite or adjacent surfaces of armpieces 100 and 101. The hinge 80 may be positioned on surfaces of the armpieces 100, 101 in such a manner as to accommodate collapsing or folding of the entire trailer alignment device 150 into a small space.

Armpieces 100, 101 are joined to provide sufficient distance between the clamping mechanism 300 and the mirror 200 to allow the operator of the tow vehicle to which the trailer alignment device 150 is reversibly attached to view the relative positions of hitch ball 13 and trailer hitch 175.

Figure 5:
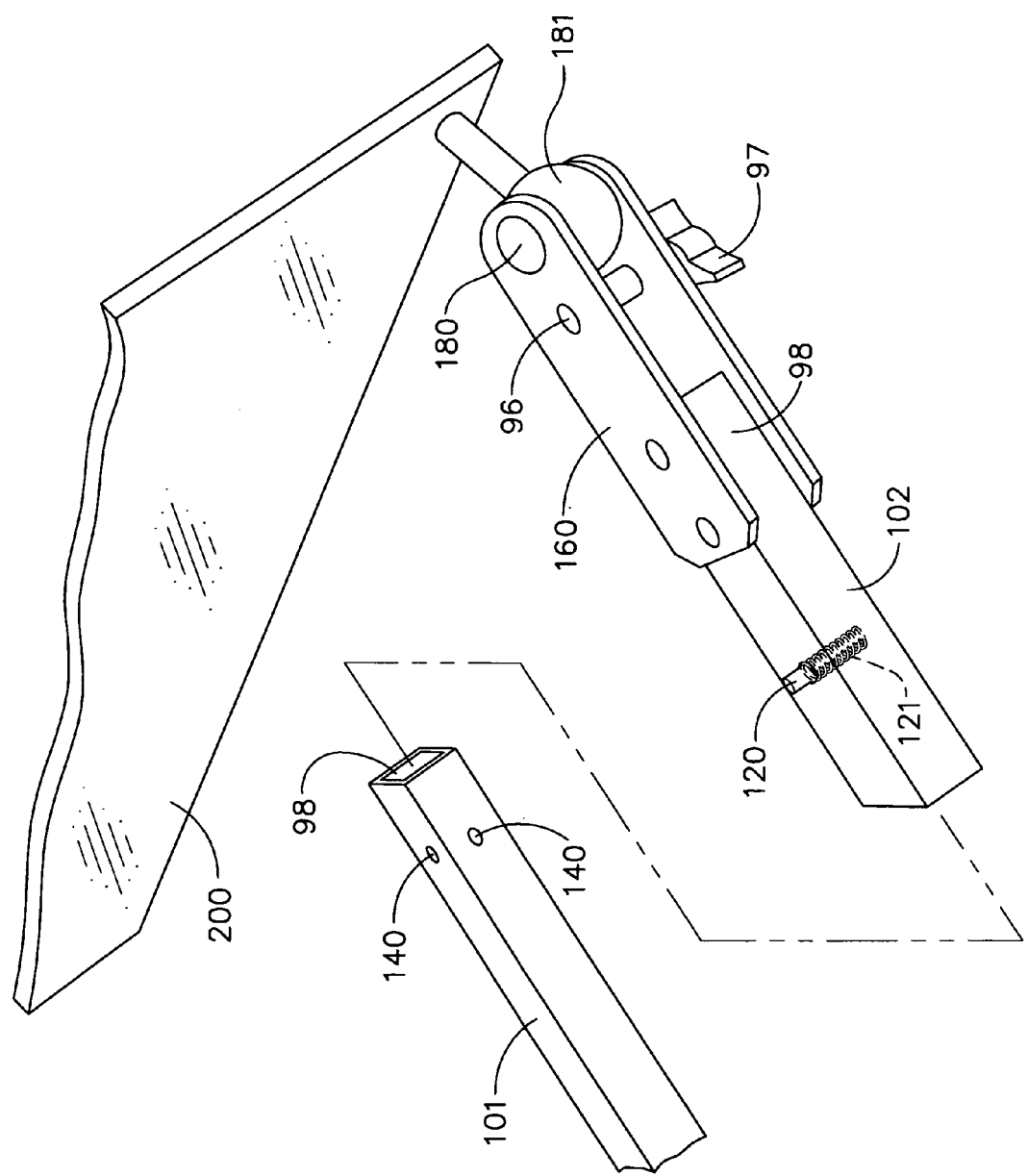
FIG. 5 is a perspective view of an adjustable mirror mount assembly of a trailer alignment device in accordance with the present invention.

FIG. 5 is a detailed drawing of an adjustable arrangement for connecting the mirror 200 to the connecting arrangement 160 and the second armpiece 101. At the proximal end of the second armpiece 101, the detachable connecting arrangement 160 is connected using the holes 140 and the anchoring arrangement 120. The connecting arrangement 160 may be slidably engaged with the second armpiece 101, and secured by an anchoring arrangement 120, such as a depressable pin having a spring 121, which provides for removable engagement of the anchoring arrangement 120 to one or more holes 140 in the second armpiece 101.

Because the second armpiece 101 is equipped to accept the anchoring arrangement 120 using holes 140, the connecting arrangement 160 may be mounted in the second armpiece 101 in several configurations to provide the desired position of mirror 200. Connecting arrangement 160 is equipped with an adjustable joint 180 by which the mirror 200 is adjustably connected to the connecting arrangement 160. A hollow aperture 98 in the connecting arrangement 160 accommodates a shaft 102 to which a pair of parallel clamp plates is anchored. Proximal to shaft 102 is a ball 181 secured to the mirror 200. A position screw 96 is loosened or tightened by turning locking handle 97 to move or secure, respectively, the mirror 200 in the desired position for use. For example, when the armpiece 100 is deployed at an angle roughly parallel to the ground, the trailer alignment device 150 is positioned suitably for viewing the mirror 200 through the operator's side external rearview mirror.

Referring now to FIGS. 1 through 5, methods of use in accordance with the present invention will be described. When the operator needs to use the trailer alignment device 150, the clamping mechanism 300 is first attached to the neck 12 of the hitch ball 13. The armpiece 100 may be folded out, and the mirror may be mounted and/or adjusted relative to the armpiece 100 position.

The angle of armpiece 100 may be rotated to an angle giving the best view of the hitch and adjacent area by inserting the anchor pin 46 into the proper pair of matched holes 45, and rotating armpiece 100 to rest against the anchor pin 46. The angle of the mirror 200 giving the best view of the hitch and adjacent area is adjusted by adjustable joint 180. As the tow vehicle approaches the trailer coupler 17, the hitch area is visible to the operator either by looking through an inside rearview mirror, an outside rearview mirror, or by turning body and neck to see the mirror 200.

With practice, these steps are very rapid. The angle between the clamping mechanism 300 and the armpiece 100 may be changed by moving a supporting pin into any of several pairs of holes; once the operator has found the angle most suitable for the operator's purpose, the anchor pin may be left in place in the proper hole when stored. This allows for even faster mounting on subsequent uses.

The clamping action of the trailer alignment device 150 affords secure mounting for the viewing aid, and the tow vehicle may be moved to the trailer 210 with a clear view of the hitch 175. For example, the operator may prefer to have the mirror 200 on the operator's side of the car, and look through the operator's side outside rearview mirror. The trailer alignment device 150 is well-suited for this purpose. Alternatively, the operator may use the mirror 200 of the trailer alignment device 150 on the passenger side of the car, and view the hitch ball 13 image in the mirror 200 of the trailer alignment device 150 by looking at it in the passenger side rearview mirror. These configurations allow the operator to judge both the distance between the hitch ball 13 and trailer coupler 17 and the relative heights of trailer coupler 17 and the hitch ball 13 as the distance between the hitch ball 13 and trailer coupler 17 decreases. Alternatively, the trailer alignment device 150 could be mounted so that it is positioned above the hitch ball 13, allowing the operator to view the reflection of the hitch ball 13 in the inside rearview mirror, or the operator could turn to look directly at the mirror 200 of the trailer alignment device 150.

Using the trailer alignment device 150, the operator could bring the tow vehicle into close proximity with the trailer coupler 17. In fact, if the trailer coupler 17 is elevated sufficiently to clear the top of the ball 13, which is the usual practice, the tow vehicle may be backed up to the trailer 210 so that the trailer coupler 17 is directly above the hitch ball 13. When the hitch ball 13 and trailer coupler 17 have been brought into this configuration using the trailer alignment device 150, without having to disconnect the trailer alignment device 150, the trailer coupler 17 may be lowered onto the hitch ball 13 to a point at which a sufficient portion of the hitch ball 13 has been engaged so that the trailer 210, although not secured, is unlikely to be able to roll away from the tow vehicle.

This point is often reached when the trailer coupler 17 has been lowered to engage about half the hitch ball, although under certain circumstances it may be possible that the trailer 210 would be prevented from rolling when less than half of the hitch ball was covered or engaged by the trailer coupler 17. After the trailer coupler 17 and hitch ball 13 have been engaged sufficiently to prevent the trailer 210 from rolling away from the tow vehicle, the trailer alignment device 150 may be removed and stowed. Alternatively, it may be removed and transferred to another hitch ball for use on another tow vehicle or several in series.

In another embodiment of a trailer alignment device 150, a light or lamp is provided in or on the trailer alignment device 150. This embodiment would be especially helpful when backing a trailer 210 into a lake to pick up a boat on a dark night. In another embodiment, the clamping device could be reversibly clamped to a suitable part of a loaded or empty trailer, with the viewing device positioned so that it is visible when the operator looks through a rearview mirror, or turns to view the trailer alignment device 150 when backing the tow vehicle to the trailer 210.

A number of the examples presented herein involve diagrams illustrating functional elements used for a trailer alignment device in accordance with embodiments of the invention. It will be understood by those skilled in the art that there exist many possible configurations in which these functional elements may be arranged and implemented. The examples depicted herein provide examples of possible functional arrangements used to implement the approaches of the invention.

Each feature disclosed in this specification (including any accompanying claims, abstract, and drawings) may be replaced by alternative features having the same, equivalent or similar purpose, unless expressly stated otherwise. Thus, unless expressly stated otherwise, each feature disclosed is one example only of a generic series of equivalent or similar features.

Various modifications and additions can be made to the embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A trailer alignment device, comprising:
 a clamping mechanism configured to rigidly and removably clamp to a neck of a trailer hitch ball;
 an arm arrangement rotatably attached to the clamping mechanism, the arm arrangement configured to extend from the clamp arrangement to beyond an edge of a tow vehicle;
 a sight rod attached to one or both of the clamping mechanism and the arm arrangement, the sight rod configured to bend in response to a trailer coupler approaching the trailer hitch ball at a predetermined distance from a selectable angle; and
 a mirror attached to the arm arrangement and configured to provide a view of the trailer hitch ball from the inside of the tow vehicle.

2. The device of claim 1, wherein the clamping mechanism comprises a pair of opposed jaws configured to adjustably clamp between a range of about 0.5 and about 2 inches.

3. The device of claim 1, wherein the clamping mechanism comprises a pair of opposed jaws configured to adjustably clamp between a range of about 0.8 and about 1.5 inches.

4. The device of claim 1, wherein the clamping mechanism comprises a pair of opposed jaws, wherein at least one of the opposed jaws comprises a U-shaped channel, providing at least a three point contact between the opposed jaws and the neck.

5. The device of claim 4, wherein the clamping mechanism comprises a five bar mechanical locking arrangement configured to lock the clamping mechanism on the neck in a first arrangement of the five bars, and to release the clamping mechanism from the neck in a second arrangement of the five bars, the first and second arrangements selected by moving a first bar selected from the five bars relative to a second bar selected from the five bars.

6. The device of claim 5, comprising an adjusting screw connected between two of the five bars and configured to adjust an opening between the opposed jaws over the clamp range.

7. The device of claim 6, comprising a lighting system coupled to the arm arrangement and configured to provide a light directed onto the ball.

8. The device of claim 1, wherein the arm arrangement comprises:
 a first arm;
 a swivel plate having a selection of openings; and a pin configured to be removably insertable into a selected opening, the pin thereby positioning the first arm at a predetermined angle of rotation relative to the clamping mechanism.

9. The device of claim 8, comprising a second arm hingedly attached to the first arm and removably attached to the mirror.

10. The device of claim 1, wherein the mirror is attached to the arm arrangement using a ball and socket, thereby providing rotational and angular adjustment of the mirror relative to the arm arrangement.

11. The device of claim 1, wherein the arm arrangement comprises a first arm, a second arm, and a hinge system coupling the first arm to the second arm.

12. The device of claim 11, wherein the hinge system comprises a spring biased pin configured to lock the first arm and the second am, in an extended position.

13. A trailer alignment device, comprising:
   means for clamping the trailer alignment device onto a neck of a trailer hitch ball;
   means for extending an arm arrangement of the trailer alignment device from a compacted arm arrangement to an extended arm arrangement;
   means for positioning a mirror, coupled to the arm arrangement, to provide a view of the trailer hitch ball from within a tow vehicle; and
   means for visually determining a trailer coupler is approaching the trailer hitch ball at a predetermined distance from a selectable angle.

14. The device of claim 13, comprising means for lighting the trailer hitch ball coupled to the arm arrangement.

15. The device of claim 13, comprising means for adjusting the clamping force of the clamping means.

16. The device of claim 13, comprising means for releasing the extending means.

17. A trailer alignment device comprising:
   a clamping mechanism configured to rigidly and removably clamp to a neck of a trailer hitch ball;
   an arm arrangement rotatably attached to the clamping mechanism, the arm arrangement configured to extend from the clamp arrangement to beyond an edge of a tow vehicle; and
   a mirror attached to the arm arrangement and configured to provide a view of the trailer hitch ball from the inside of the tow vehicle;
   wherein the clamping mechanism comprises a pair of opposed jaws, wherein at least one of the opposed jaws comprises a U-shaped channel, providing at least a three point contact between the opposed jaws and the neck.

18. The device of claim 17, comprising a lighting system coupled to the arm arrangement and configured to provide a light directed onto the ball.

19. The device of claim 17, comprising a sight rod attached to the clamping device and configured to bend in response to a trailer coupler approaching the trailer hitch ball at a predetermined distance from a selectable angle.

20. The device of claim 17, wherein the arm arrangement comprises:
   a first arm;
   a swivel plate having a selection of openings; and
   a pin configured to be removably insertable into a selected opening, the pin thereby positioning the first arm at a predetermined angle of rotation relative to the clamping mechanism.

* * * * *